United States Patent
Chauhan et al.

(10) Patent No.: US 10,684,950 B2
(45) Date of Patent: Jun. 16, 2020

(54) SYSTEM FOR TRIGGERING CROSS CHANNEL DATA CACHING

(71) Applicant: Bank of America Corporation, Charlotte, NC (US)

(72) Inventors: Sandeep Kumar Chauhan, Hyderabad (IN); Sarat Kumar Magatapalli, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 33 days.

(21) Appl. No.: 15/922,226

(22) Filed: Mar. 15, 2018

(65) Prior Publication Data

US 2019/0286564 A1    Sep. 19, 2019

(51) Int. Cl.
  *G06F 12/0862* (2016.01)
  *G06F 12/0875* (2016.01)
  *G06F 16/23* (2019.01)

(52) U.S. Cl.
  CPC ...... *G06F 12/0862* (2013.01); *G06F 12/0875* (2013.01); *G06F 16/23* (2019.01); *G06F 2212/154* (2013.01); *G06F 2212/602* (2013.01); *G06F 2212/6024* (2013.01)

(58) Field of Classification Search
  CPC .. G06F 12/0862; G06F 6/23; G06F 2212/154; G06F 2212/602; G06F 2212/6024
  See application file for complete search history.

(56) References Cited

U.S. PATENT DOCUMENTS

| | | |
|---|---|---|
| 5,802,292 A | 9/1998 | Mogul |
| 6,003,114 A | 12/1999 | Bachmat |
| 6,085,193 A | 7/2000 | Kenneth et al. |
| 6,128,701 A | 10/2000 | Malcolm et al. |
| 6,272,598 B1 | 8/2001 | Arlitt et al. |
| 6,766,422 B2 | 7/2004 | Beyda |
| 6,813,501 B2 | 11/2004 | Kinnunen et al. |
| 7,054,917 B1 | 5/2006 | Kirsch et al. |
| 7,454,393 B2 | 11/2008 | Horvitz et al. |
| 8,112,409 B2 | 2/2012 | Shen et al. |
| 8,364,611 B2 | 1/2013 | Tendjoukian et al. |
| 8,688,453 B1 | 4/2014 | Joshi et al. |
| 8,793,706 B2 | 7/2014 | Villadsen et al. |
| 8,886,576 B1 * | 11/2014 | Sanketi .............. G06K 9/00 706/12 |

(Continued)

*Primary Examiner* — Nanci N Wong

(74) *Attorney, Agent, or Firm* — Michael A. Springs; Moore & Van Allen PLLC; Peter B. Stewart

(57) ABSTRACT

Embodiments of the present invention provide a system for triggering cross channel data caching. Historical event data and live event data of a user may be monitored to determine an expected event that comprises one or more expected channels. An expected period of time for the expected event may also be determined. Relevant user data may then be identified from one or more systems of record and cached or otherwise compressed. One or more adapters configured to format cached data into the one or more expected channels are then identified. The cached data is then transmitted to databases associated with each of the one or more expected channels, where the cached data is converted by the adapters. The cached data is then generally maintained in these databases for the expected period of time.

17 Claims, 6 Drawing Sheets

(56) References Cited

U.S. PATENT DOCUMENTS

| | | |
|---|---|---|
| 9,015,081 B2 | 4/2015 | Horvitz et al. |
| 9,047,235 B1* | 6/2015 | Barraclough ........... G06F 15/16 |
| 2003/0187960 A1 | 10/2003 | Koba et al. |
| 2005/0005007 A1 | 1/2005 | Keohane et al. |
| 2005/0060498 A1 | 3/2005 | Curtis |
| 2006/0106784 A1 | 5/2006 | Alpha |
| 2007/0067293 A1 | 3/2007 | Yu |
| 2009/0056525 A1* | 3/2009 | Oppenheimber .... G10H 1/0058 84/609 |
| 2009/0063646 A1* | 3/2009 | Mitnick ................. G06Q 10/10 709/206 |
| 2009/0328087 A1* | 12/2009 | Higgins ................. H04N 7/173 725/10 |
| 2010/0070554 A1 | 3/2010 | Richardson et al. |
| 2012/0198020 A1* | 8/2012 | Parker ................... H04W 12/08 709/217 |
| 2012/0259821 A1* | 10/2012 | Alam ................. H04L 67/2852 707/692 |
| 2015/0095587 A1* | 4/2015 | Xu ........................ G06F 12/126 711/136 |
| 2016/0021164 A1* | 1/2016 | Chakarapani ......... G06F 16/783 709/224 |
| 2017/0041267 A1* | 2/2017 | Walkin .................... H04L 67/26 |

* cited by examiner

SYSTEM FOR TRIGGERING CROSS CHANNEL DATA CACHING

BACKGROUND

Supporting remote databases or servers having limited hardware capacity (including limited central processing units, limited random access memory, and limited bandwidth) with time-sensitive data from a central location has involved the transmittal of cached data in response to determining that these remote databases or servers require the data. Typical cache replacement policies of least recently used (LRU), first in first out (FIFO), time aware least recently used (TLRU), and the like have been used to maintain the cached data at each of these remote databases and servers. However, these current systems do not provide cached data to the remote databases or servers at a point in time prior to when the data is required by the databases and do not account for expected time-based maintenance of the cached data.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for triggering cross channel data caching. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve monitoring historical event data of a customer and live event data of the customer. The system may then determine an expected event based on the historical event data of the customer and the live event data of the customer, wherein the expected event comprises one or more expected channels. In some embodiments, the system may identify, from one or more systems of record, a set of data associated with the customer, based on the expected event. Next, the system may cache the set of data associated with the customer to generate a set of cached data. The system may then identify one or more adapters configured to format the set of cached data into formats compatible with each of the one or more expected channels. Finally, in some embodiments, the system may transmit the set of cached data to a database associated with each of the one or more expected channels, wherein the set of cached data is converted into the formats compatible with each of the one or more expected channels by the identified one or more adapters.

In some embodiments of the system, determining the expected event further comprises determining an expected event period of time; and wherein the processing device is further configured to execute computer-readable program code to maintain cached data in each database associated with each of the one or more expected channels for the expected event period of time. In some such embodiments, the system may determine that the expected event period of time has concluded, and determine that the expected event is not occurring. In response to determining that the expected event period of time has concluded, and in response to determining that the expected event is not occurring, the system may then delete the cached data from each database associated with each of the one or more expected channels. In other embodiments, the system may determine that the expected event is occurring, and determine that the expected event time period has concluded. In such embodiments, the system may maintain the cached data in each database associated with each of the one or more expected channels for at least as long as the expected event is occurring.

Determining the expected event may, in some embodiments of the system, further comprise determining an expected event period of time for each of the one or more expected channels.

In some embodiments, the expected event of the system comprises an expectation that the customer will access an online portal while in a foreign geographic region. Likewise, a first channel of the one or more expected channels comprises an online portal linked to a first database located in the foreign geographic region. Finally, in some such embodiments, the step of transmitting the set of cached data to each database associated with each of the one or more expected channels further comprises transmitting the set of cached data to the first database.

Furthermore, in some embodiments, the expected event of the system comprises an expectation that the customer will contact a managing entity by calling the managing entity or by physically visiting an office of the managing entity. In some such embodiments, a first channel of the one or more expected channels comprises an interactive voice response application linked to a first database, and a second channel of the one or more expected channels comprises an office records system associated with the office of the managing entity that is linked to a second database. Finally, in some such embodiments, the step of transmitting the set of cached data to each database associated with each of the one or more expected channels further comprises transmitting the set of cached data to the first database and to the second database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
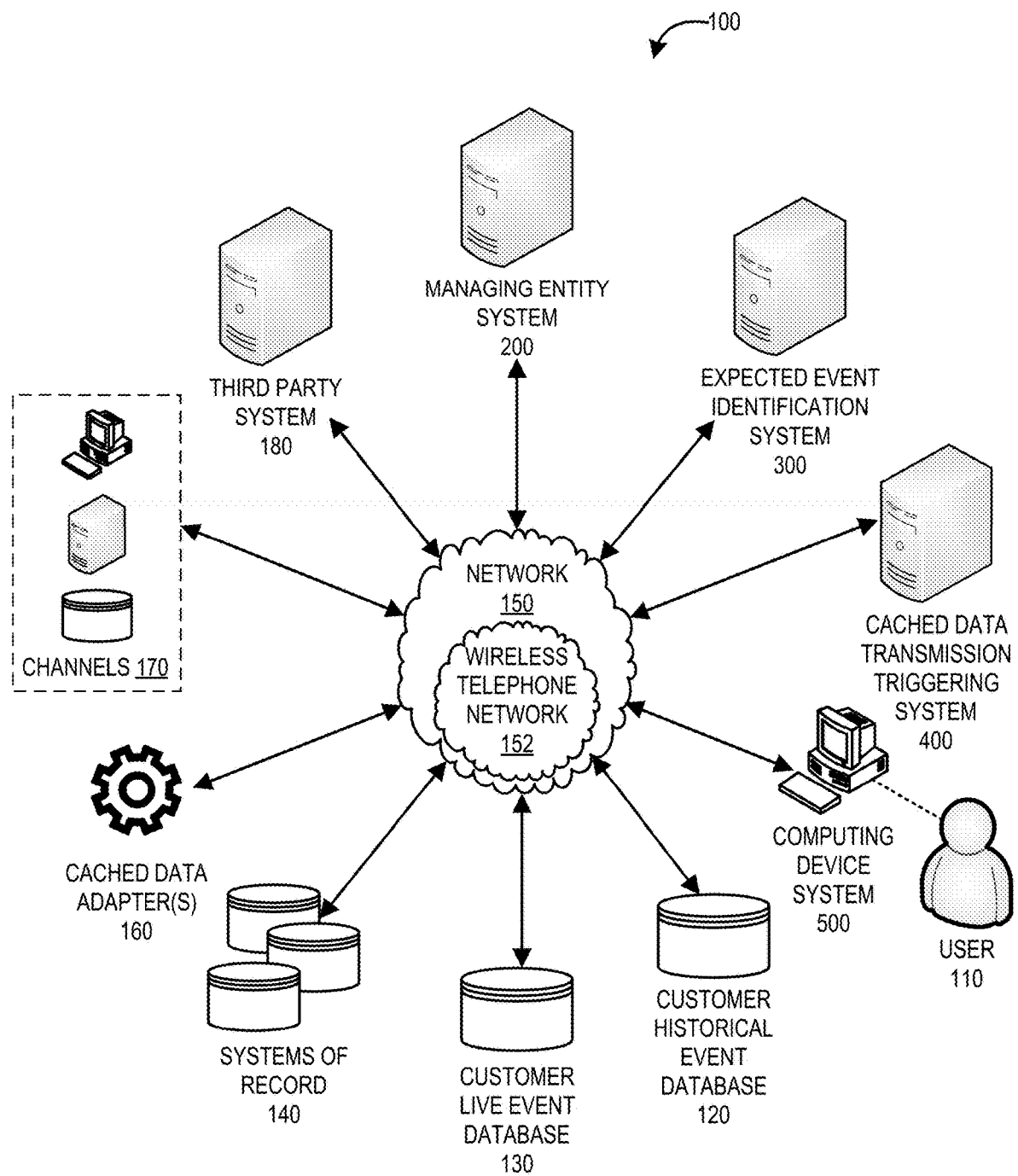
Figure 2:
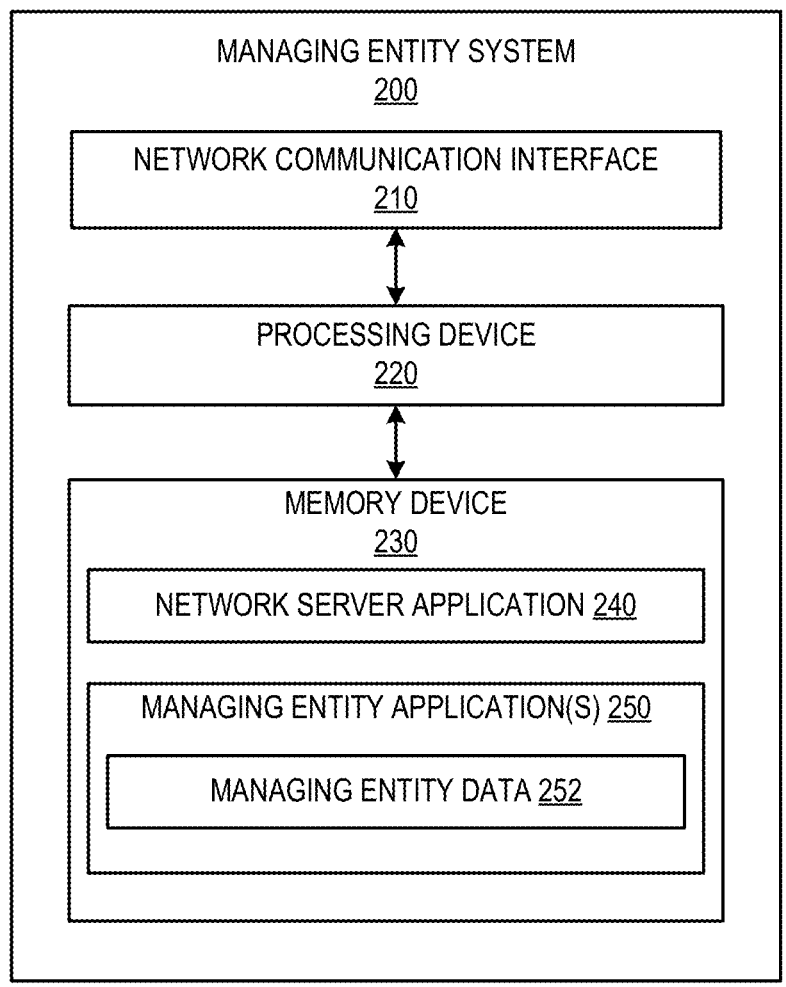
Figure 3:
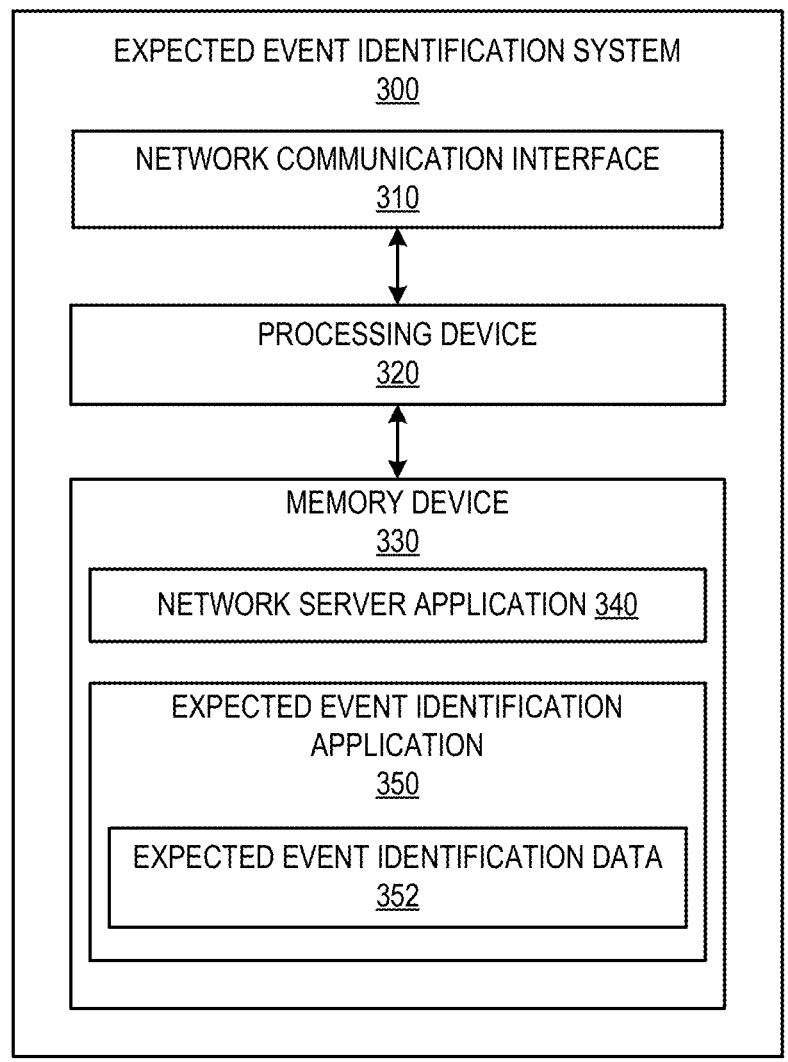
Figure 4:
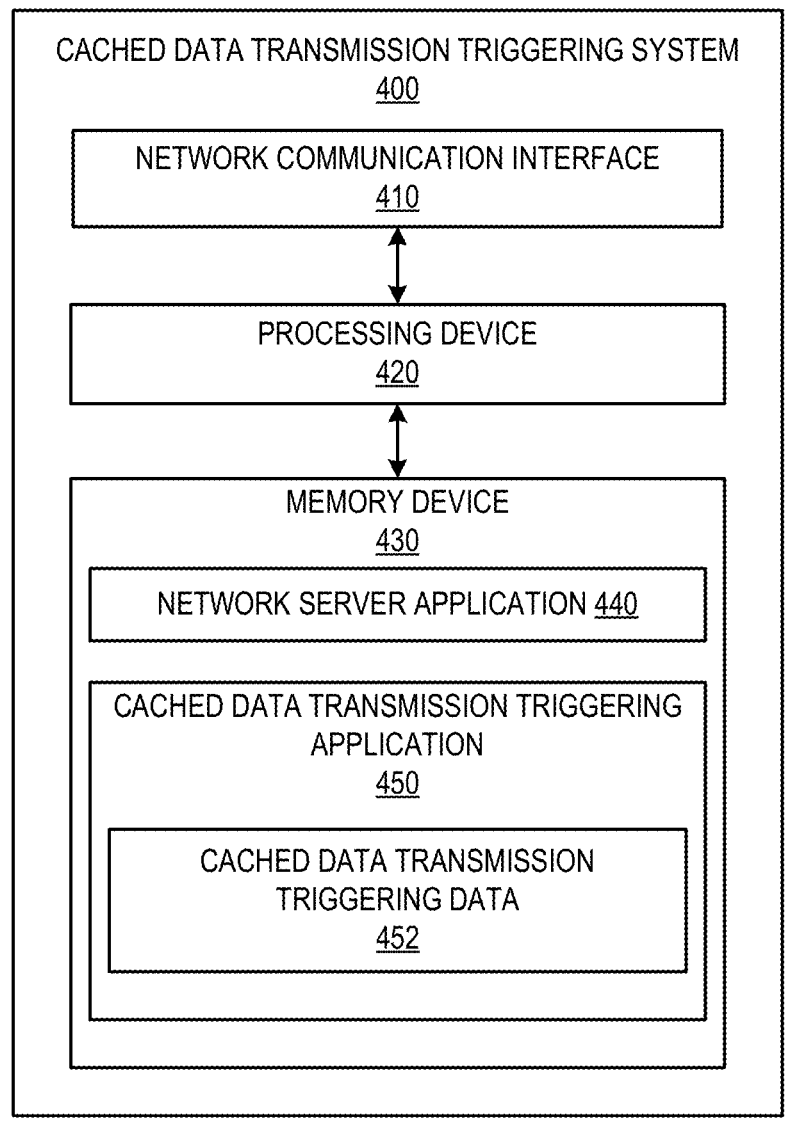
Figure 5:
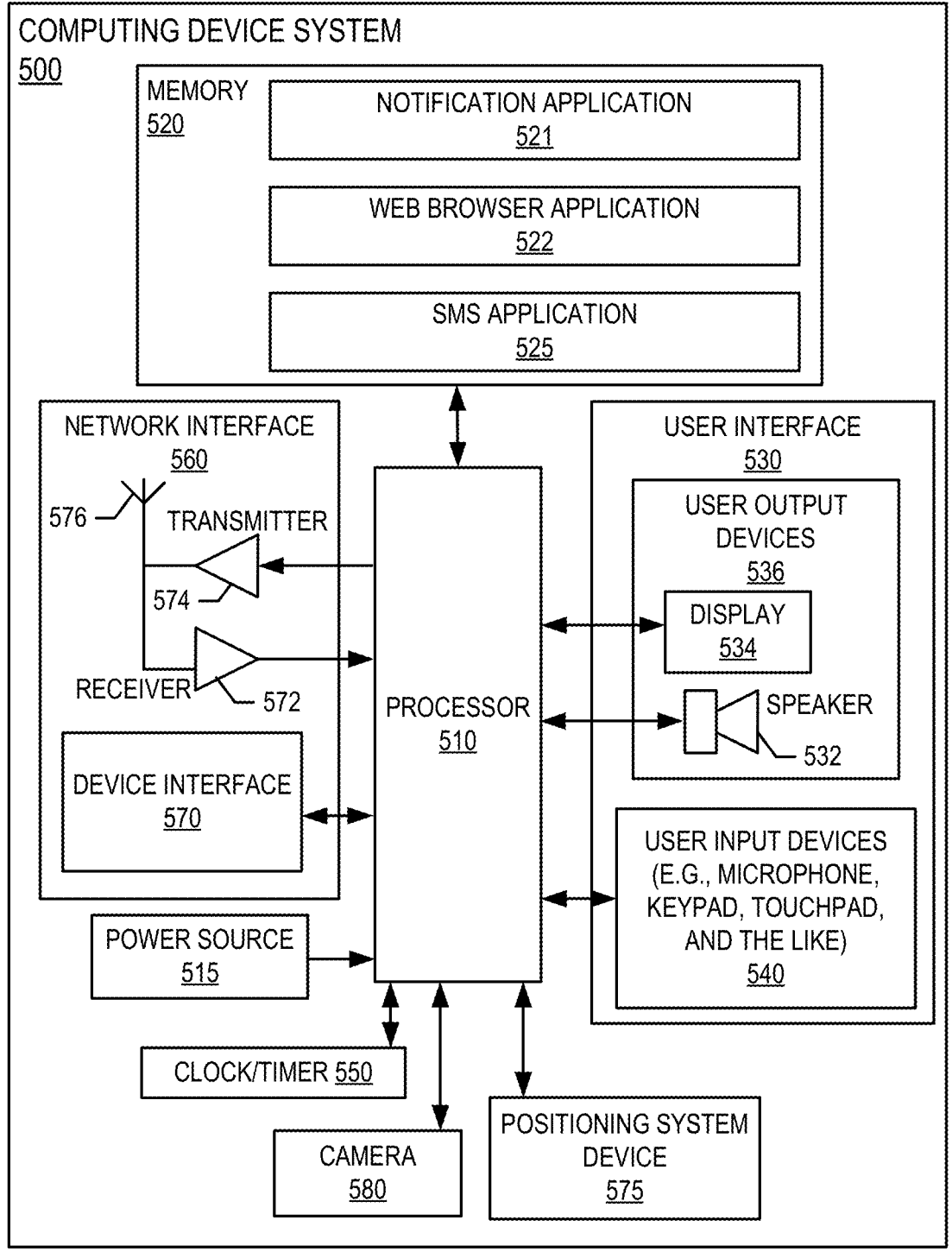
Figure 6:
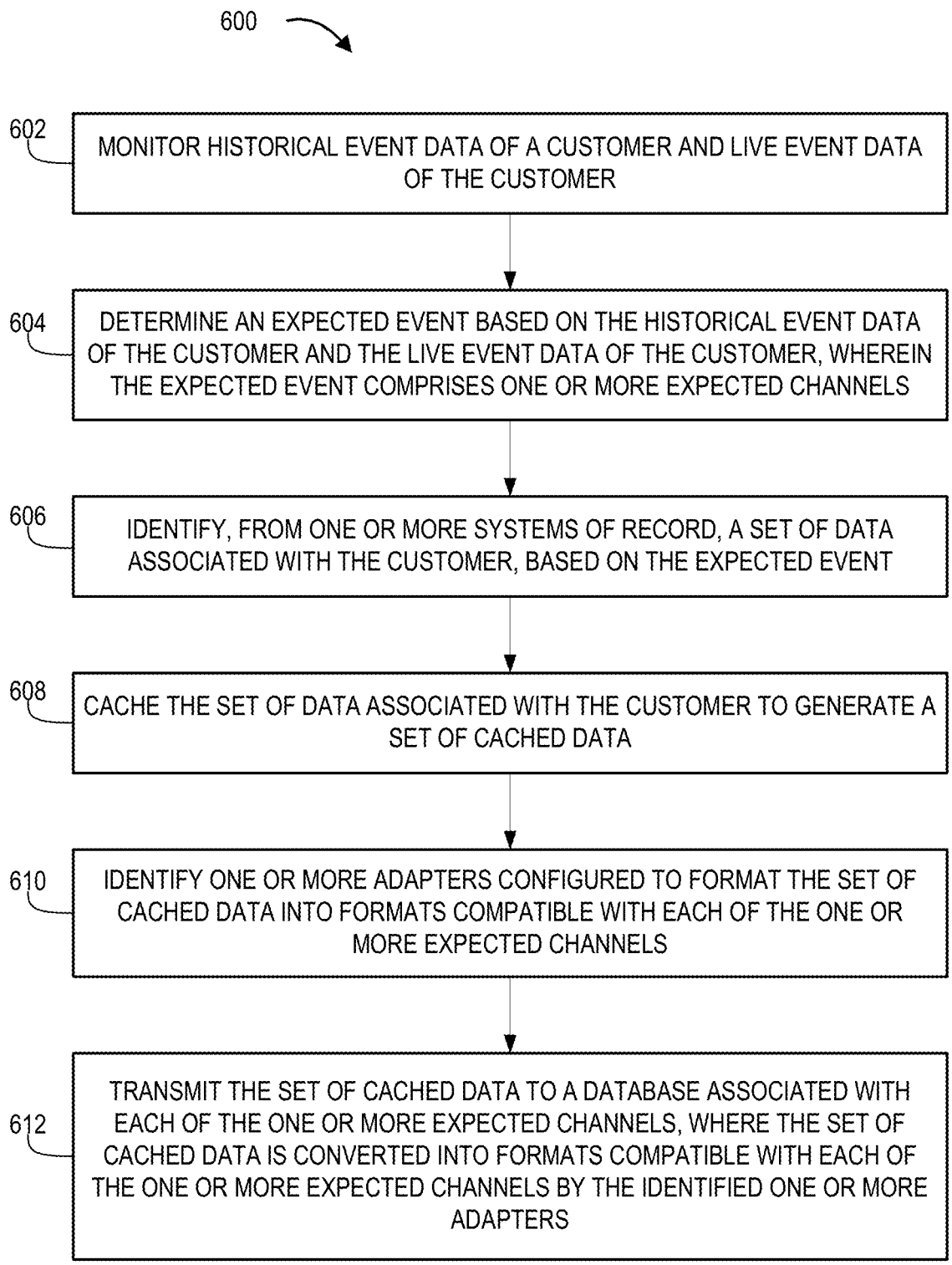

Having thus described embodiments of the invention in general terms, reference will now be made the accompanying drawings, wherein:

FIG. 1 provides a block diagram illustrating a system environment for triggering cross channel data caching, in accordance with an embodiment of the invention;

FIG. 2 provides a block diagram illustrating the managing entity system of FIG. 1, in accordance with an embodiment of the invention;

FIG. 3 provides a block diagram illustrating the expected event identification system of FIG. 1, in accordance with an embodiment of the invention;

FIG. 4 provides a block diagram illustrating the cached data transmission triggering system of FIG. 1, in accordance with an embodiment of the invention;

FIG. 5 provides a block diagram illustrating the computing device system of FIG. 1, in accordance with an embodiment of the invention; and FIG. 6 provides a flowchart illustrating a process for triggering cross channel data caching, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for triggering cross channel data caching. In general, the system will determine that a particular event is likely to happen at some point in the near future, and define this event as an "expected event." The expected event generally is a future action between a customer and a managing entity (e.g., a financial institution), where this future action is predicted to occur during a determined or identified period of time (e.g., after at least ten minutes, but within the next four hours), and where the future action may occur through one or more "channels." The channels are the communication channels, portals, customer support systems, automated teller machines, electronic kiosks, physical offices, and the like that facilitate communication between the customer and the managing entity (e.g., a managing entity computing system, an employee of the managing entity, or the like).

Once the expected event has been identified and/or defined, the system will then identify customer data that may be needed during the expected event from one or more systems of record. Once the customer data has been pulled, the customer data is cached to reduce the size of the data for data transmission purposes. Next, the system can identify adapters for each channel, where the adapters are configured to re-format the cached data into one or more formats that are compatible with the adapter's respective channel(s). The cached data is then re-formatted by the adapters and transmitted to database or servers linked to each of the channels. The cached data can be maintained in these servers and databases for the identified expected period of time so that the channels will have the customer's data readily available prior to the customer initiating the interaction with the managing entity through the associated channel.

FIG. 1 provides a block diagram illustrating a system environment 100 for triggering cross channel data caching, in accordance with an embodiment of the invention. As illustrated in FIG. 1, the environment 100 includes a managing entity system 200, an expected event identification system 300, a cached data transmission triggering system 400, one or more computing device system(s) 500, a customer historical event database 120, a customer live event database 130, one or more systems of record 140, one or more cached data adapters 160, one or more channels 170, and one or more third party systems 180. One or more users 110 may be included in the system environment 100. In some embodiments, the user(s) 110 of the system environment 100 may be a customer of a managing entity that owns or otherwise controls the managing entity system 200.

The managing entity system 200, the expected event identification system 300, the cached data transmission triggering system 400, the computing device system(s) 500, the customer historical event database 120, the customer live event database 130, the systems of record 140, the cached data adapter(s) 160, the one or more channels 170 (including one or more remote databases or servers linked with or otherwise associated with each of the one or more channels), and/or the third party system 180 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the network includes a wireless telephone network 152.

The managing entity system 200 may be a system owned or otherwise controlled by a managing entity to perform one or more process steps described herein. In some embodiments, the managing entity is a financial institution. In general, the managing entity system 200 is configured to communicate information or instructions with the expected event identification system 300, the cached data transmission triggering system 400, the computing device system(s) 500, the customer historical event database 120, the customer live event database 130, the systems of record 140, the cached data adapter(s) 160, the one or more channels 170, and/or the third party system 180 across the network 150. For example, the managing entity system 200 may monitor the customer historical event database 120 and/or the customer live event database 130. The managing entity system 200 may also be configured to identify customer data from the systems of record 140. The managing entity system 200 may also be configured to communicate monitored or identified data to the expected event identification 300, the cached data transmission triggering system 400, the computing device system 500, the cached data adapter(s) 160, the channels 170, and/or a third party system 180. Of course, the managing entity system 200 may be configured to perform (or instruct other systems to perform) one or more other process steps described herein. The managing entity system 200 is described in more detail with respect to FIG. 2.

The expected event identification system 300 may by a system owned or controlled by the managing entity and/or a third party that specializes in monitoring historical and live event data of a customer, identifying triggering actions, determining an expected event (including expected channels associated with the expected event and an expected period of time associated with the expected event). In general, the expected event identification system 300 is configured to communicate information or instructions with the managing entity system 200, the cached data transmission triggering system 400, the computing device system(s) 400, the customer historical event database 120, the customer live event database 130, and/or the third party system 180 across the network 150. In some embodiments, at least a portion of the expected event identification system 300 is a component of the managing entity system 200. Furthermore, the expected event identification system 300 may utilize artificial intelligence and/or machine learning engines or systems to perform one or more of the functions described herein.

For example, the expected event identification system 300 may monitor the customer historical event database 120 and the customer live event database to detect a triggering action and determine an expected action for the customer based on the monitored data. The expected event identification system 300 can also communicate the expected action and any data or information related to the expected action to the managing entity system 200 and/or the cached data transmission triggering system 400. Of course, the expected event identification system 300 may be configured to perform (or instruct other systems to perform) one or more other process steps described herein. The expected event identification system 300 is described in more detail with respect to FIG. 3.

The cached data transmission triggering system 400 may by a system owned or controlled by the managing entity and/or a third party that specializes in identifying customer data from one or more systems of record (e.g., the systems of record 140), caching data, and transmitting cached data to certain channels (e.g., the channels 170), possibly through one or more cached data adapters (e.g., the cached data adapters 160). In general, the cached data transmission triggering system 400 is configured to communicate information or instructions with the managing entity system 200, the expected event identification system 300, the computing device system(s) 500, the systems of record 140, the cached data adapter(s) 160, the one or more channels 170, and/or the third party system 180 across the network 150. In some embodiments, at least a portion of the cached data transmission triggering system 400 is a component of the managing entity system 200. Furthermore, the cached data transmission triggering system 400 may utilize artificial intelligence and/or machine learning engines or systems to perform one or more of the functions described herein.

For example, the cached data transmission triggering system 400 may be configured to receive an expected event (or information associated with an expected event) from the expected event identification system 300. The cached data transmission triggering system 400 may also be configured to identify customer data from the systems of record 140. In some embodiments, the cached data transmission triggering system 400 is configured to run cached data through the cached data adapters 160. Finally, the cached data transmission triggering system 400 may be configured to transmit cached data to one or more remote databases or servers associated with the channels 170. Of course, the cached data transmission triggering system 400 may be configured to perform (or instruct other systems to perform) one or more other process steps described herein. The cached data transmission triggering system 400 is described in more detail with respect to FIG. 4.

The computing device system 500 may by a system owned or controlled by the managing entity, the user 110, and/or a third party that specializes in providing computing devices to users (e.g., the user 110) and/or providing data and receiving user inputs from computing devices in conjunction with the system embodiments herein. In general, the computing device system 500 is configured to communicate information or instructions with the managing entity system 200, the expected event identification system 300, the cached data transmission triggering system 400, the customer historical event database 120, the customer live event database 130, the systems of record 140, the one or more cached data adapters 160, and/or the third party system 180 across the network 150.

For example, the computing device system 500 may be operated or otherwise owned by a customer, where the computing device system 500 provides real-time data (e.g., location data, customer action data, transaction data of the customer using a computing device, online traffic data, and the like) to the customer live event database 130. In some embodiments, a computing device system 500 may be associated with one or more channels 170, where the computing device system 500 may receive transmitted cached data of a customer from the cached data transmission triggering system 400 and/or the cached data adapter(s) 160. Of course, the computing device system 500 may be configured to perform (or instruct other systems to perform) one or more other process steps described herein. The computing device system 500 is described in more detail with respect to FIG. 5.

The customer historical event database 120 may comprise a network communication interface, a processing device, and one or more memory devices, where the processing devices are configured to perform certain actions with the memory devices and communicate these actions to the rest of the network 150 through the network communication interface. The data or information stored in the customer historical event database 120 may include, but is not limited to, any data, information, data trends, or the like that can be used to identify or determine correlations between certain triggering actions. For example, the data stored in the customer historical event database 120 may include information about triggering events that have prompted a customer (e.g., the user 110) to interact with a managing entity associated with processes described herein.

A triggering action may be the action of a notification being sent to the customer (e.g., the user), where the notification indicates that a payment cannot be processed, that an issue with an account of the user has been identified, and the like. The triggering action may also be an action performed by the user without a prompt by the managing entity (e.g., purchasing a travel ticket to another geographic region, changing ownership or access rights to an account associated with the user, purchasing a particular product or service, or the like). The historical event data may include information about which events appear to have been triggered by the triggering action.

For example, if the triggering action was a notification that a transaction cannot be processed, the triggered event (i.e., historical event) may have been for the customer to call a customer support line of the managing entity, call a representative of the customer that works for the managing entity, log into an online portal, physically visit an office of the managing entity, interact with an automated teller machine associated with the managing entity, interact with an electronic kiosk of the managing entity, or the like. This information can be stored in the customer historical event database 120.

The data stored in the customer historical event database 120 may further include information about an amount of time between the triggering action and the historical event (i.e., the time period between when the triggering action and a starting time of the historical event).

For example, for a particular historical event, the system may determine that the customer called into a customer support line of the managing ten minutes after receiving a notification that a transaction of the customer could not be processed. Furthermore, the system can determine how long each historical event took, and store this information as historical event data in the customer historical event database 120.

The system can also store information about trends, averages, and other statistical information in the customer historical event database 120. For example, the system can determine that it takes the customer an average of thirty minutes to call into a particular customer support line after a particular triggering action, with a lower limit of ten minutes and an upper limit of two hours. The system can also determine an amount of time that the customer was engaged in each historical event, an average amount of time that the customer has been engaged in the same type of historical events, lower and upper limits of the amount of time that the customer has been engaged in the same type of historical events, and the like. As such, the system can store information about expected periods of time that the customer may be engaging with that particular type of event. For example, the system can establish an expected period of time of a particular type of event as beginning at the lower limit of the amount of time to begin the event, and lasting for the amount of time associated with the upper limit of how long the customer has been engaged with the event. Of course, the system can also add or subtract a certain percentage (e.g. five percent, ten percent, or the like) or period of time (e.g., ten minutes, five hours, or the like) to the expected period of time that the customer could be engaged with the particular type of event.

The historical event data stored in the customer historical event database may also identify one or more channels (e.g., the channels 170) that the customer uses when interacting with the managing entity during each historical event. As there are several potential events that may be likely or predictable for each triggering action, the system may identify and store a likelihood that the customer will interact with each channel in response to a particular triggering event or triggering event type (each interaction, or the set of possible interactions together, being referred to as an expected event) within the customer historical event database 120.

The customer live event database 130 may comprise a network communication interface, a processing device, and one or more memory devices, where the processing devices are configured to perform certain actions with the memory devices and communicate these actions to the rest of the network 150 through the network communication interface. The customer live event database 130 data may include similar information to the customer historical event database, but the live event database may receive constant, real-time, and/or near real-time updates to its data to inform the system on currently-occurring actions, notifications, incidents, and other occurrences that may trigger the subsequent occurrence of an expected event.

Each of the systems of record 140 may comprise a network communication interface, a processing device, and one or more memory devices, where the processing devices are configured to perform certain actions with the memory devices and communicate these actions to the rest of the network 150 through the network communication interface. The systems of record 140 may comprise any information storage system(s) with authoritative data, linkages, customer information, account information, and the like, as stored, owned, maintained, or otherwise managed by the managing entity. In some embodiments, multiple systems of record 140 may be included in the system environment 100. For example, a first system of record 140 may be associated with customer account data, a second system of record 150 may be associated with transaction processing data for the managing entity, a third system of record 140 may be associated with access entitlements associated with the managing entity, and the like.

The cached data adapter(s) 160 may comprise one or more devices, applications, systems, or the like that are configured to convert the cached data into a format that is readable or otherwise accessible to a particular channel of the channels 170. For example, a first adapter may be configured to convert cached data into a format that is compatible with databases that are local to a channel of a records system for a physical office. Additionally, a second adapter may be configured to convert cached data into a format that is compatible with a database in a foreign geographical region that supports an online portal in that foreign geographical region. Furthermore, a third adapter may be configured to convert cached data into a format that is compatible with databases that are local to or otherwise linked with an interactive voice response application channel. As such, the cached data adapter(s) 160 may be configured to receive cached data in a first data format from the systems of record 140 and/or the cached data transmission triggering system 400

The channels 170 represent modes of interacting with the managing entity. The channels 170 may include, but are not limited to, dialing into a customer support line, dialing into a customer representative line, dialing into an interactive voice response line, logging into or otherwise accessing an online portal, logging into or otherwise accessing a mobile application portal while in a particular geographical region, and the like. Each of the channels 170 may be associated with or linked with one or more databases or servers that provide pools of data from which systems of the channels 170 can extract the cached data to perform one or more actions. These databases of the channels 170 may be disparate or otherwise remote from the managing entity system 200.

The third party system 180 may be any other system that performs one or more of the steps, procedures, actions, or the like described herein.

FIG. 2 provides a block diagram illustrating the managing entity system 200 in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/ repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, managing entity applications 250 which include managing entity data 252, and other computer-executable instructions or other data. The computer-executable program code of the network server application 240, and/or the managing entity applications 250 may instruct the processing device 220 to perform certain logic, data-processing, and data-storing functions of the managing entity system 200 described herein, as well as communication functions of the managing entity system 200.

In one embodiment, a managing entity application(s) 250 comprises a data monitoring application, where customer historical event data, customer live event data, and the like comprise the managing entity data 252. In such embodiments, the managing entity application 250 monitors data related to a customer (e.g., the user 110), and may be configured to identify a triggering action from the customer data to identify an expected event.

The managing entity application 250 may comprise a customer communication application configured to transmit notifications, information, data, portals, software applications, and the like to one or more computing device systems 500 in the system environment 100.

The network server application 240 and the managing entity application(s) 250 are configured to invoke or use the managing entity data 252 and the like when communicating through the network communication interface 210 with the expected event identification system 300, the cached data transmission triggering system 400, and computing device systems 500, and the like.

FIG. 3 provides a block diagram illustrating the expected event identification system 300 in greater detail, in accordance with embodiments of the invention. As illustrated in FIG. 3, in one embodiment of the invention, the expected event identification system 300 includes one or more processing devices 320 operatively coupled to a network communication interface 310 and a memory device 330. In certain embodiments, the expected event identification system 300 is operated by a first entity, such as a financial institution, while in other embodiments, the expected event identification system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the expected event identification system 300 described herein. For example, in one embodiment of the expected event identification system 300, the memory device 330 includes, but is not limited to, a network server application 340, one or more expected event identification applications 350 which include event identification data 352, and other computer-executable instructions or other data. The computer-executable program code of the network server application 340, and/or the one or more expected event identification applications 350 may instruct the processing device 320 to perform certain logic, data-processing, and data-storing functions of the expected event identification system 300 described herein, as well as communication functions of the expected event identification system 300.

One expected event identification application 350 may comprise a data monitoring application 350 configured to access, scan, analyze, trawl, pull, or otherwise monitor data and information from the customer historical event database 120 and/or the customer live event database 130. This data monitoring application may further be configured to identify, deduce, or otherwise determine or predict an expected event from customer data identified from the customer historical event database 120 and/or the customer live event database 130.

In some embodiments, an expected event identification application 350 may comprise an artificial intelligence application or a machine learning application that is configured to process data using a knowledge base and a built-in logic structure. As such, the artificial intelligence applications or machine learning applications may carry out at least a portion of the actions or steps performed by the expected event identification system 300, as described herein.

The network server application 340 and the one or more expected event identification applications 350 are configured to invoke or use the event identification data 352 and the like when communicating through the network communication interface 310 with the customer historical event database 120, the customer live event database 130, the managing entity system 200, the cached data transmission triggering system 400, one or more computing device systems 500, and the like. The processing device 320 is configured to use the network communication interface 310 to transmit and/or receive data and/or commands to and/or from the other devices connected to the network 150.

FIG. 4 provides a block diagram illustrating the cached data transmission triggering system 400 in greater detail, in accordance with embodiments of the invention. As illustrated in FIG. 4, in one embodiment of the invention, the cached data transmission triggering system 400 includes one or more processing devices 420 operatively coupled to a network communication interface 410 and a memory device 430. In certain embodiments, the cached data transmission triggering system 400 is operated by a first entity, such as a financial institution, while in other embodiments, the cached data transmission triggering system 400 is operated by an entity other than a financial institution.

It should be understood that the memory device 430 may include one or more databases or other data structures/repositories. The memory device 430 also includes computer-executable program code that instructs the processing device 420 to operate the network communication interface 410 to perform certain communication functions of the cached data transmission triggering system 400 described herein. For example, in one embodiment of the cached data transmission triggering system 400, the memory device 430 includes, but is not limited to, a network server application 440, and one or more cached data transmission triggering applications 450 that include cached data transmission triggering data 452, and other computer-executable instructions or other data. The computer-executable program code of the network server application 440, and/or the one or more cached data transmission triggering applications 450 may instruct the processing device 420 to perform certain logic, data-processing, and data-storing functions of the cached data transmission triggering system 400 described herein, as well as communication functions of the cached data transmission triggering system 400.

One embodiment of a cached data transmission triggering application 450 comprises a data caching application that is configured to receive customer data and cache the received customer data into a cache for compressed storage. In such embodiments, the cached data may be stored, at least temporarily, within the cached data transmission triggering system 400 as the cached data transmission triggering data 452.

Another embodiment of a cached data transmission triggering applications 450 comprises a cached data transmission application that is configured to transmit cached data to remote databases associated with or linked to the one or more channels 170 of the system environment 100. In some such embodiments, the cached data transmission application may be configured to first transmit the cached data to the one or more adapters 160 of the system environment 100 to have the cached data converted into a format that is compatible with the remote databases associated with the one or more channels 170.

Furthermore, the cached data transmission triggering application 450 may comprise or embody one or more artificial intelligence applications or systems or machine learning applications or systems that are configured to process data using a knowledge base and a built-in logic structure. As such, the artificial intelligence applications or machine learning applications may carry out at least a portion of the actions or steps performed by the cached data transmission triggering system 400, as described herein.

The network server application 440 and the one or more cached data transmission triggering applications 450 are configured to invoke or use the cached data transmission triggering data 452 and the like when communicating through the network communication interface 410 with the managing entity system 200, the expected event identification system 300, the one or more computing device systems 500, the systems of record 140, the cached data adapters 160, the channels 170, and the like. The processing device 420 is configured to use the network communication interface 410 to transmit and/or receive data and/or commands to and/or from the other devices connected to the network 150.

FIG. 5 provides a block diagram illustrating a computing device system 500 of FIG. 1 in more detail, in accordance with embodiments of the invention. In one embodiment of the invention, the computing device system 500 is a mobile telephone. However, it should be understood that a mobile telephone is merely illustrative of one type of computing device system 500 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 500 include a processor 510 communicably coupled to such devices as a memory 520, user output devices 536, user input devices 540, a network interface 560, a power source 515, a clock or other timer 550, a camera 580, and a positioning system device 575. The processor 510, and other processors described herein, generally include circuitry for implementing communication and/or logic functions of the computing device system 500. For example, the processor 510 may include a digital signal processor device, a microprocessor device, and various analog to digital converters, digital to analog converters, and/or other support circuits. Control and signal processing functions of the computing device system 500 are allocated between these devices according to their respective capabilities. The processor 510 thus may also include the functionality to encode and interleave messages and data prior to modulation and transmission. The processor 510 can additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the computing device system 500 to transmit and receive web content, such as, for example, location-based content and/or other web page content, according to a Wireless Application Protocol (WAP), Hypertext Transfer Protocol (HTTP), and/or the like.

The processor 510 is configured to use the network interface 560 to communicate with one or more other devices on the network 150. In this regard, the network interface 560 includes an antenna 576 operatively coupled to a transmitter 574 and a receiver 572 (together a "transceiver"). The processor 510 is configured to provide signals to and receive signals from the transmitter 574 and receiver 572, respectively. The signals may include signaling information in accordance with the air interface standard of the applicable cellular system of the wireless network 152. In this regard, the computing device system 500 may be configured to operate with one or more air interface standards, communication protocols, modulation types, and access types. By way of illustration, the computing device system 500 may be configured to operate in accordance with any of a number of first, second, third, and/or fourth-generation communication protocols and/or the like. For example, the computing device system 500 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 5GPP protocols and/or the like. The computing device system 500 may also be configured to operate in accordance with non-cellular communication mechanisms, such as via a wireless local area network (WLAN) or other communication/data networks.

As described above, the computing device system 500 has a user interface that is, like other user interfaces described herein, made up of user output devices 536 and/or user input devices 540. The user output devices 536 include a display 534 (e.g., a liquid crystal display or the like) and a speaker 532 or other audio device, which are operatively coupled to the processor 510.

The user input devices 540, which allow the computing device system 500 to receive data from a user such as the user 110, may include any of a number of devices allowing the computing device system 500 to receive data from the user 110, such as a keypad, keyboard, touch-screen, touchpad, microphone, mouse, joystick, other pointer device, button, soft key, and/or other input device(s). The user interface may also include a camera 580, such as a digital camera.

The computing device system 500 may also include a positioning system device 575 that is configured to be used by a positioning system to determine a location of the computing device system 500. For example, the positioning system device 575 may include a GPS transceiver. In some embodiments, the positioning system device 575 is at least partially made up of the antenna 576, transmitter 574, and receiver 572 described above. For example, in one embodiment, triangulation of cellular signals may be used to identify the approximate or exact geographical location of the computing device system 500. In other embodiments, the positioning system device 575 includes a proximity sensor or transmitter, such as an RFID tag, that can sense or be sensed by devices known to be located proximate a merchant or other location to determine that the computing device system 500 is located proximate these known devices. The positioning system device 575 may play a crucial role in transmitting location information associated with the computing device system 500 for determining when the computing device system 500 is in at or is in close proximity to a particular geographic region.

The computing device system 500 further includes a power source 515, such as a battery, for powering various circuits and other devices that are used to operate the computing device system 500. Embodiments of the computing device system 500 may also include a clock or other timer 550 configured to determine and, in some cases, communicate actual or relative time to the processor 510 or one or more other devices.

The computing device system 500 also includes a memory 520 operatively coupled to the processor 510. As used herein, memory includes any computer readable medium (as defined herein below) configured to store data, code, or other information. The memory 520 may include volatile memory, such as volatile Random Access Memory (RAM) including a cache area for the temporary storage of data. The memory 520 may also include non-volatile memory, which can be embedded and/or may be removable. The non-volatile memory can additionally or alternatively include an electrically erasable programmable read-only memory (EEPROM), flash memory or the like.

The memory 520 can store any of a number of applications which comprise computer-executable instructions/code executed by the processor 510 to implement the functions of the computing device system 500 and/or one or more of the process/method steps described herein. For example, the memory 520 may include such applications as a conventional web browser application 522 and/or a notification application 521 (or any other application provided by the managing entity system 200). These applications also typically instructions to a graphical user interface (GUI) on the display 534 that allows the user 110 to interact with the computing device system 500, the managing entity system 200, and/or other devices or systems. In one embodiment of the invention, when the user 110 decides to enroll in a notification application 521 program, the user 110 downloads, is assigned, or otherwise obtains the notification application 521 from the managing entity system 200, or from a distinct application server (e.g., from the expected event identification system 300). In other embodiments of the invention, the user 110 interacts with the managing entity system 200 or the resource accumulation system 500 via the web browser application 522 in addition to, or instead of, the notification application 521.

The memory 520 of the computing device system 500 may comprise a Short Message Service (SMS) application 523 configured to send, receive, and store data, information, communications, alerts, and the like via the wireless telephone network 152.

The notification application 521 of the computing device system 500 may be configured to receive alerts, triggering actions, and the like from the managing entity system 200 and/or the expected event identification system 300 that are in turn configured to cause the user interface 530 to provide a message, notification, alert, or the like to a customer (e.g., the user 110). The notification application 521 may also be configured to prompt the customer (e.g., the user 110) for user input via the user input devices 540, to receive user input from the user input devices 540, and the like.

The memory 520 can also store any of a number of pieces of information, and data, used by the computing device system 500 and the applications and devices that make up the computing device system 500 or are in communication with the computing device system 500 to implement the functions of the computing device system 500 and/or the other systems described herein.

Referring now to FIG. 6, a flowchart is provided to illustrate one embodiment of a process 600 for triggering cross channel data caching, in accordance with embodiments of the invention. In some embodiments, the process 600 may include block 602, where the system monitors historical event data of a customer and live event data of the customer.

The historical event data of a customer may be any data, information, data trends, or the like that can be used by the system to identify or determine correlations between certain triggering actions, the occurrence of previous events, the timing of the occurrence of the previous events, the channel (s) utilized by the user for each of the previous events, and the like. For example, the historical event data of the customer may include information about triggering events that have prompted the customer to interact with a managing entity associated with this process 600. A triggering action may be the action of a notification being sent to the customer, where the notification indicates that a payment cannot be processed, that an issue with an account of the user has been identified, and the like. The triggering action may also be an action performed by the user without a prompt by the managing entity (e.g., purchasing a travel ticket to another geographic region, changing ownership or access rights to an account associated with the user, purchasing a particular product or service, or the like). The historical event data may include information about which events appear to have been triggered by the triggering action. For example, if the triggering action was a notification that a transaction cannot be processed, the triggered event (i.e., historical event) may have been for the customer to call a customer support line of the managing entity, call a representative of the customer that works for the managing entity, log into an online portal, physically visit an office of the managing entity, interact with an automated teller machine associated with the managing entity, interact with an electronic kiosk of the managing entity, or the like.

The historical event data of the customer may further include information about an amount of time between the triggering action and the historical event (i.e., the time period between when the triggering action and a starting time of the historical event). For example, for a particular historical event, the system may determine that the customer called into a customer support line of the managing ten minutes after receiving a notification that a transaction of the customer could not be processed. Furthermore, the system can determine how long each historical event took, and store this information as historical event data.

The system can also store information about trends, averages, and other statistical information regarding the historical event data. For example, the system can determine that it takes the customer an average of thirty minutes to call into a particular customer support line after a particular triggering action, with a lower limit of ten minutes and an upper limit of two hours. The system can also determine an amount of time that the customer was engaged in each historical event, an average amount of time that the customer has been engaged in the same type of historical events, lower and upper limits of the amount of time that the customer has been engaged in the same type of historical events, and the like. As such, the system can store information about expected periods of time that the customer may be engaging with that particular type of event. For example, the system can establish an expected period of time of a particular type of event as beginning at the lower limit of the amount of time to begin the event, and lasting for the amount of time associated with the upper limit of how long the customer has been engaged with the event. Of course, the system can also add or subtract a certain percentage (e.g. five percent, ten percent, or the like) or period of time (e.g., ten minutes, five hours, or the like) to the expected period of time that the customer could be engaged with the particular type of event.

The historical event data may also identify one or more channels that the customer uses when interacting with the managing entity during each historical event. As used herein, a "channel" is a mode of interacting with the managing entity. The channels may include, but are not limited to, dialing into a customer support line, dialing into a customer representative line, dialing into an interactive voice response line, logging into or otherwise accessing an online portal, logging into or otherwise accessing a mobile application portal while in a particular geographical region, and the like. As there are several potential events that may be likely or predictable for each triggering action, the system may identify a likelihood that the customer will interact with each channel in response to a particular triggering event or triggering event type (each interaction, or the set of possible interactions together, being referred to as an expected event).

The customer live event database data may include similar information to the customer historical event database, but the live event database may receive constant, real-time, and/or near real-time updates to its data to inform the system on currently-occurring actions, notifications, incidents, and other occurrences that may trigger the subsequent occurrence of an expected event.

In some embodiments, the process 600 includes block 604, where the system determines an expected event based on the historical event data of the customer and the live event data of the customer, wherein the expected event comprises one or more expected channels. In this way, the system may analyze the customer live event database to determine that a triggering action is occurring, has occurred, or is likely to occur shortly. The system can then identify which expected event is associated with the identified triggering action (e.g., from the customer historical event database or another database where the linkages between known triggering actions and known expected events are stored).

The system can also identify a triggering event from the customer live event database and then analyze the customer historical event database to determine an expected event based on the historical data of the customer, similar customers, and the identified triggering event.

The determination of the expected event may further comprise a determination of an expected event period of time. As noted above, the expected event period of time may comprise a beginning time (or date and time), and an end date or time (e.g., start time plus maximum expected duration of the expected event). In general, the expected event period of time comprises a period of time where it is anticipated that the customer is likely to interact with the managing entity through one or more of the channels. For example, after the customer receives a notification of a transaction that the managing entity cannot process, the system may be able to expect that the user will dial in to a customer support line between five minutes and three hours after the notification, and that the interaction with the customer through the customer support line likely will last a maximum amount of thirty minutes. The system can then set the expected period of time to start at five minutes after the notification and to end or conclude at three hours and thirty minutes after the notification. In this way, the system can expect that the databases associated with the customer support line to need to have this customer's information ready for the duration of the expected time period, while these databases associated with and local to the customer support line do not regularly need to maintain this customer's data.

As the expected event may be associated with multiple channels, the expected event period of time may be different for each channel. Therefore the step of determining the expected event may further comprise determining an expected event period of time for each of the one or more expected channels. For example, the system may have determined that the customer may additionally or alternatively interact with the managing entity by physically visiting an office of the managing entity. The system may determine from the customer's historical event data that the customer's expected time period for this channel begins one hour after the notification and ends after forty-eight hours.

While the expected time period for the one or more expected channels is described as being determined based on the customer historical event database and/or the customer live event database, it should be known that the system may have preset or otherwise predetermined expected time periods that are based on the channel, the customer, the geographic region, or the like. For example, these predetermined expected time periods may be determined by a specialist employee of the managing entity to cover the time period during which it is expected that one or more databases associated with the expected channel(s) will need to locally store certain data related to the customer.

Additionally, in some embodiments, the process 600 includes block 606, where the system identifies, from the one or more systems of record, a set of data associated with the customer, based on the expected event. The system may, in some embodiments, identify all data that is related to the customer (e.g., account data of the customer, historical transaction data of the customer, pending transaction data of the customer, and the like).

In other embodiments, the system may identify certain data that the customer likely will need access to, or that a representative or specialist employed by the managing entity will need access to, as part of the expected event. For example, if the triggering action comprises a notification that a transaction for the customer could not be processed by the managing entity, the system may identify all data from the systems of record that are related to the transaction, the merchant, the customer, the financial account being used by the customer, the financial instrument used by the customer, and the like. In this way, the system may identify a subset of all customer data that is likely needed for reference or information purposes by the customer and/or the managing entity during the expected event. By only identifying the subset of customer data that is actually useful to the customer during the expected event, the system can reduce the computing resources required to transmit this data at a later point in time.

The step of identifying the set of data associated with the customer from the system(s) of record may further include a step of performing a data verification, validation, testing, and the like. If the system determines that the identified data is incomplete or does not meet what the system expects will be needed to provide appropriate support to the customer during the expected event, the system can transmit a notification and information request to the customer and/or to a specialist associated with the missing data, and receive the necessary data at a point in time prior to, or during, the expected event.

In a similar manner, the system may check inputs associated with the expected event to determine whether adequate information has been acquired or determined for the system to determine which customer data is needed, what the expected period of time is, and/or at which channel(s) the customer data is needed. If the system determines that additional information is needed for defining the expected event, the system can transmit a notification and request for information from a specialist employee of the managing entity system that is trained to identify the appropriate information and generate a corrected expected event that can be used for the customer.

The process 600 may also include block 608, where the system caches the set of data associated with the customer to generate a set of cached data. Any caching application, module, computer processing unit cache, graphics processing unit cache, digital signal processors cache, disk cache, web cache, memorization cache, or the like that is configured to reduce the size of a set of data. The set of data associated with the customer may be cached and stored in a particular format that may or may not be compatible with possible channels.

In some embodiments, the process 600 includes block 610, where the system identifies one or more adapters configured to format the set of cached data into formats compatible with each of the one or more expected channels. Each adapter may be configured to convert the cached data into a format that is readable or otherwise accessible to a particular channel. For example, a first adapter may be configured to convert cached data into a format that is compatible with databases that are local to a channel of a records system for a physical office. Additionally, a second adapter may be configured to convert cached data into a format that is compatible with a database in a foreign geographical region that supports an online portal in that foreign geographical region. Furthermore, a third adapter may be configured to convert cached data into a format that is compatible with databases that are local to or otherwise linked with an interactive voice response application channel.

Finally, the process 600 may continue to block 612, where the system transmits the set of cached data to a database associated with each of the one or more expected channels, where the set of cached data is converted into formats compatible with each of the one or more expected channels by the identified one or more adapters. The transmission of the cached data may be conducted through data sharding, data replication, or the like. In this way, the channels will be prepared for an interaction with the customer by having the customer's data readily available on local databases or servers of those channels. This technique reduces the amount of time that it takes for the customer data to be pulled up for displaying to the customer and/or a representative assisting the customer. Additionally, the transmission of the cached data can be conducted at a point in time when the computing resources of the system are not strained by a large amount of data transmissions.

In embodiments where the system has identified multiple expected periods of time for the different channels, the system may order the channels to which cached data is transmitted based on a starting date and time of each expected period of time. For example, the expected event may be associated with a first channel of a call center with a first expected period of time that starts ten minutes after the triggering event occurs, and the expected event may be associated with a second channel of a local office of the managing entity with a second expected period of time that starts one hour after the triggering event occurs. In this scenario, the system may prioritize the first channel (due to the earlier start time) and transmit the cached data to the database(s) associated with the first channel before turning its computing resources to the task of transmitting the cached data to the database(s) associated with the second channel.

In embodiments where the system has identified an expected event period of time, the system may be configured to maintain the cached data in each database associated with each of the one or more expected channels for the expected event period of time. For example, the system may determine that the expected event period of time has concluded. Next, the system may determine that the expected event is not currently occurring (e.g., the user is not interacting with the managing entity via a mobile application, at an office of the managing entity, on a phone call with representatives of the managing entity, and the like). In response to determining that the expected event period of time has concluded, and in response to determining that the expected event is not occurring, the system can automatically delete the cached data from each database associated with each of the one or more expected channels. In this way, the system can keep the amount of data stored at each database(s) and/or server(s) linked with each channel at a lower amount than if the system was simply storing customer data for any possible future interaction with the managing entity through that channel. Furthermore, by reducing the amount of data stored in a database or server, the system aides the effectiveness of the database or server performance.

If the expected event period of time is determined to have concluded, but the system determines that the expected event is occurring (e.g., the user is not interacting with the managing entity via a mobile application, at an office of the managing entity, on a phone call with representatives of the managing entity, and the like), then the system can continue to maintain the cached data in each database of the one or more expected channels for at least as long as the expected event is occurring. In this way, the system ensures that the customer data remains readily available to the customer and/or a specialist or representative that is assisting the customer for the duration of the interaction, even if the interaction has gone beyond an expected time period.

The system may further be configured to maintain or delete the cached data that is stored in the databases associated with each of the one or more expected channels, based at least in part on a determination that the customer has interacted with a different channel of the one or more expected channels. For example, the system may determine that the expected event comprises either dialing in to an interactive voice response system or (i.e., not "and" or "and/or") accessing an online portal of the managing entity. If the system then determines that the customer has dialed in to the interactive voice response system, then the system can automatically delete the cached customer data from the database(s) linked with the online portal because there is a very low chance that the customer will also be accessing the online portal. Therefore, in some embodiments, the system may determine that the customer is interacting with the managing entity through a first channel of the one or more expected channels, and automatically delete the cached data in all other channels of the one or more expected channels.

As an example of this process 600, the system may determine that the expected event comprises an expectation that the customer will access an online portal while in a foreign geographic region. In such embodiments, the system may identify a first channel of the one or more expected channels as comprising an online portal linked to a first database located in the foreign geographic region. Therefore, when transmitting the set of cached data to each database associated with each of the one or more expected channels, the system may transmit the set of cached data to the first database, where the cached data is converted into a format that is compatible with the first database by an adapter.

In another example of this process 600, the system may determine that the expected event comprises an expectation that the customer will contact a managing entity by calling the managing entity or by physically visiting an office of the managing entity. In such embodiments, the system may identify a first channel of the one or more expected channels that comprises an interactive voice response application (i.e., an application that is used when the customer calls the managing entity) linked to a first database. Additionally, the system may identify a second channel of the one or more expected channels that comprises an office records system associated with the office of the managing entity, where this office records system is linked to a second database. Therefore, transmitting the set of cached data to each database associated with each of the one or more expected channels comprises transmitting the set of cached data to the first database (after converting the cached data into formats compatible with each of the first and second databases, respectively, using adapters).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer implemented method for triggering cross channel data caching, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
monitoring historical event data of a customer and live event data of the customer;
determining an expected event based on the historical event data of the customer and the live event data of the customer, wherein the expected event comprises one or more expected channels, wherein determining the expected event further comprises determining an expected event period of time that is a period of time that the customer is likely to interact with a managing entity through one or more of the channels, and wherein each of the one or more expected channels comprises communication channels, portals, customer support systems, automated teller machines, or electronic kiosks that facilitate communication between the customer and the managing entity;
identifying, from one or more systems of record, a set of data associated with the customer, based on the expected event;
caching the set of data associated with the customer to generate a set of cached data;
identifying one or more adapters configured to format the set of cached data into formats compatible with each of the one or more expected channels;
transmitting the set of cached data to a database associated with each of the one or more expected channels, wherein the set of cached data is converted into the formats compatible with each of the one or more expected channels by the identified one or more adapters; and
maintaining the set of cached data in each database associated with each of the one or more expected channels for the expected event period of time.

2. The computer implemented method of claim 1, further comprising:
determining that the expected event period of time has concluded;
determining that the expected event is not occurring; and
in response to determining that the expected event period of time has concluded, and in response to determining that the expected event is not occurring, deleting the set of cached data from each database associated with each of the one or more expected channels.

3. The computer implemented method of claim 1, further comprising:
determining that the expected event is occurring;
determining that the expected event period of time period has concluded; and
maintaining the set of cached data in each database associated with each of the one or more expected channels for at least as long as the expected event is occurring.

4. The computer implemented method of claim 1, wherein determining the expected event further comprises determining an expected event period of time for each of the one or more expected channels.

5. The computer implemented method of claim 1, wherein the expected event comprises an expectation that the customer will access an online portal while in a foreign geographic region; wherein a first channel of the one or more expected channels comprises the online portal linked to a first database located in the foreign geographic region; and wherein transmitting the set of cached data to each database associated with each of the one or more expected channels comprises transmitting the set of cached data to the first database.

6. A computer program product for triggering cross channel data caching, the computer program product comprising at least one non-transitory computer readable medium comprising computer readable instructions, the instructions comprising instructions for:
monitoring historical event data of a customer and live event data of the customer;
determining an expected event based on the historical event data of the customer and the live event data of the customer, wherein the expected event comprises one or more expected channels, wherein determining the expected event further comprises determining an expected event period of time that is a period of time that the customer is likely to interact with a managing entity through one or more channels, and wherein each of the one or more expected channels comprises communication channels, portals, customer support systems, automated teller machines, or electronic kiosks that facilitate communication between the customer and the managing entity;

identifying, from one or more systems of record, a set of data associated with the customer, based on the expected event;

caching the set of data associated with the customer to generate a set of cached data;

identifying one or more adapters configured to format the set of cached data into formats compatible with each of the one or more expected channels;

transmitting the set of cached data to a database associated with each of the one or more expected channels, wherein the set of cached data is converted into the formats compatible with each of the one or more expected channels by the identified one or more adapters, and maintaining the set of cached data in each database associated with each of the one or more expected channels for the expected event period of time.

7. The computer program product of claim 6, wherein the computer readable instructions further comprise instructions for:

determining that the expected event period of time has concluded;

determining that the expected event is not occurring; and in response to determining that the expected event period of time has concluded, and in response to determining that the expected event is not occurring, deleting the set of cached data from each database associated with each of the one or more expected channels.

8. The computer program product of claim 6, wherein the computer readable instructions further comprise instructions for:

determining that the expected event is occurring;

determining that the expected event period of time period has concluded; and maintaining the set of cached data in each database associated with each of the one or more expected channels for at least as long as the expected event is occurring.

9. The computer program product of claim 6, wherein determining the expected event further comprises determining an expected event period of time for each of the one or more expected channels.

10. The computer program product of claim 6, wherein the expected event comprises an expectation that the customer will access an online portal while in a foreign geographic region; wherein a first channel of the one or more expected channels comprises the online portal linked to a first database located in the foreign geographic region; and wherein transmitting the set of cached data to each database associated with each of the one or more expected channels comprises transmitting the set of cached data to the first database.

11. The computer program product of claim 6, wherein the expected event comprises an expectation that the customer will contact the managing entity by calling the managing entity or by physically visiting an office of the managing entity; wherein a first channel of the one or more expected channels comprises an interactive voice response application linked to a first database; wherein a second channel of the one or more expected channels comprises an office records system associated with the office of the managing entity that is linked to a second database; and wherein transmitting the set of cached data to each database associated with each of the one or more expected channels comprises transmitting the set of cached data to the first database and to the second database.

12. A system for triggering cross channel data caching, the system comprising:

a memory device; and a processing device operatively coupled to the memory device, wherein the processing device is configured to execute computer-readable program code to:

monitor historical event data of a customer and live event data of the customer;

determine an expected event based on the historical event data of the customer and the live event data of the customer, wherein the expected event comprises one or more expected channels, wherein determining the expected event further comprises determining an expected event period of time that is a period of time that the customer is likely to interact with a managing entity through one or more of the channels, and wherein each of the one or more expected channels comprises communication channels, portals, customer support systems, automated teller machines, or electronic kiosks that facilitate communication between the customer and the managing entity;

identify, from one or more systems of record, a set of data associated with the customer, based on the expected event;

cache the set of data associated with the customer to generate a set of cached data;

identify one or more adapters configured to format the set of cached data into formats compatible with each of the one or more expected channels;

transmit the set of cached data to a database associated with each of the one or more expected channels, wherein the set of cached data is converted into the formats compatible with each of the one or more expected channels by the identified one or more adapters; and maintain the set of cached data in each database associated with each of the one or more expected channels for the expected event period of time.

13. The system of claim 12, wherein the processing device is further configured to execute computer-readable program code to:

determine that the expected event period of time has concluded;

determine that the expected event is not occurring; and in response to determining that the expected event period of time has concluded, and in response to determining that the expected event is not occurring, delete the set of cached data from each database associated with each of the one or more expected channels.

14. The system of claim 12, wherein the processing device is further configured to execute computer-readable program code to:

determine that the expected event is occurring;

determine that the expected event period of time period has concluded; and maintain the set of cached data in each database associated with each of the one or more expected channels for at least as long as the expected event is occurring.

15. The system of claim 12, wherein determining the expected event further comprises determining an expected event period of time for each of the one or more expected channels.

16. The system of claim 12, wherein the expected event comprises an expectation that the customer will access an online portal while in a foreign geographic region; wherein a first channel of the one or more expected channels comprises the online portal linked to a first database located in the foreign geographic region; and wherein transmitting the set of cached data to each database associated with each of the one or more expected channels comprises transmitting the set of cached data to the first database.

17. The system of claim 12, wherein the expected event comprises an expectation that the customer will contact the managing entity by calling the managing entity or by physically visiting an office of the managing entity; wherein a first channel of the one or more expected channels comprises an interactive voice response application linked to a first database; wherein a second channel of the one or more expected channels comprises an office records system associated with the office of the managing entity that is linked to a second database; and wherein transmitting the set of cached data to each database associated with each of the one or more expected channels comprises transmitting the set of cached data to the first database and to the second database.

\* \* \* \* \*